United States Patent [19]

Morris

[11] 4,016,766
[45] Apr. 12, 1977

[54] COUNTING ACCELEROMETER APPARATUS
[75] Inventor: Harold D. Morris, Orinda, Calif.
[73] Assignee: Systron Donner Corporation, Concord, Calif.
[22] Filed: Nov. 30, 1973
[21] Appl. No.: 420,537

Related U.S. Application Data
[63] Continuation of Ser. No. 137,209, April 26, 1971, abandoned, which is a continuation-in-part of Ser. No. 841,271, July 14, 1969, abandoned.
[52] U.S. Cl. .......................... 73/517 R; 235/92 AE; 235/92 PB
[51] Int. Cl.² ........................................ G01P 15/08
[58] Field of Search ............. 73/91, 489, 517, 88.5; 235/92 PB, 92 PC, 92 AE, 92 ME, 92 MT

[56] References Cited
UNITED STATES PATENTS

| | | | |
|---|---|---|---|
| 2,590,057 | 3/1952 | Wiegand | 235/92 PB |
| 2,688,441 | 9/1954 | Merrill et al. | 235/168 |
| 2,774,535 | 12/1956 | Anderson | 235/92 |
| 2,867,382 | 1/1959 | Weaver | 235/92 AE |
| 2,879,053 | 3/1959 | Weaver | 235/92 AE |
| 3,074,279 | 1/1963 | Morris | 73/517 R |
| 3,426,586 | 2/1969 | Kadlec | 73/88.5 R |
| 3,460,383 | 8/1969 | Padera | 73/88.5 R |
| 3,517,550 | 6/1970 | Leventhal | 73/88.5 R |

Primary Examiner—James J. Gill
Attorney, Agent, or Firm—Flehr, Hohbach, Test, Albritton & Herbert

[57] ABSTRACT

Counting apparatus having a transducer for measuring a certain parameter and providing an output, with filtering means for filtering the output from the transducer and decision circuit means connected to the output of the filtering means capable of registering various levels of output from the filtering means and having counting means for counting the various levels of output which have occurred.

27 Claims, 1 Drawing Figure

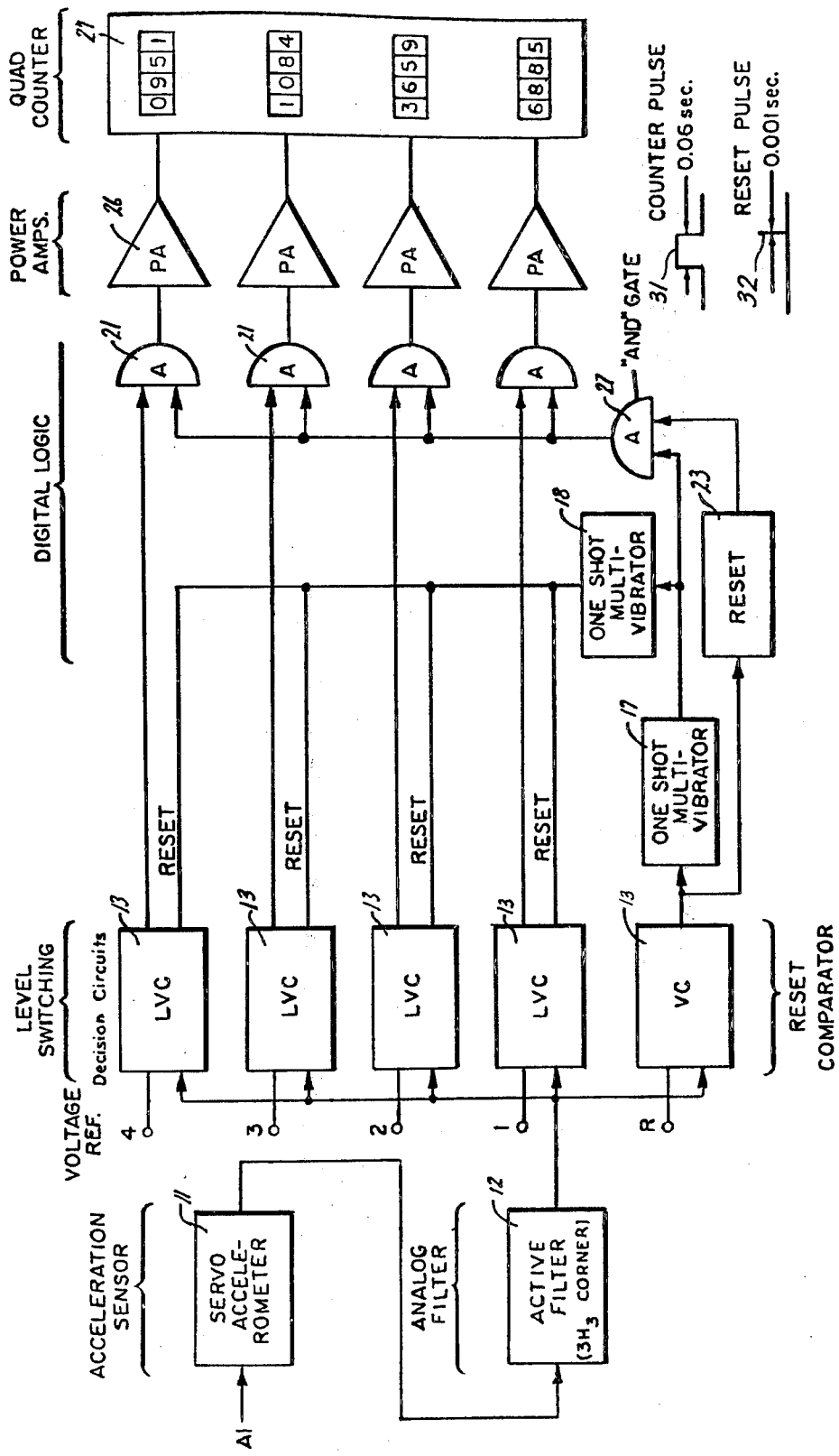

COUNTING ACCELEROMETER APPARATUS

CROSS-REFERENCE TO RELATED APPLICATIONS

This application is a continuation of application Ser. No. 137,209, filed Apr. 26, 1971 now abandoned which was a continuation-in-part of application Ser. No. 841,271, filed July 14, 1969 now abandoned.

BACKGROUND OF THE INVENTION

Counting accelerometers have heretofore been provided of the mechanical type. In general, they consisted of a cylindrical mass which was yieldably retained in the center of a cylinder. The cylinder was sized to permit the mass to travel longitudinally of the cylinder. The cylinder carried contacts which were adjustable and which were adapted to be physically engaged by the mass at various load levels. Since such a counting accelerometer was substantially mechanical in operation, it had various undesirable features. For example, it would malfunction under vibration. In addition, its useful service life was limited to such an extent because of wear and other factors that it has not been particularly feasible to utilize counting accelerometers of this type. There is, therefore, a need for a new and improved counting accelerometer.

In connection with counting accelerometers, it has been found that measuring acceleration does not give an exact correlation to the degree of stress which has been encountered by an aircraft. This is because the degree of stress is related to the gross weight of the aircraft which may change because of the bomb load or the fuel load carried by the aircraft. To precisely measure the true stress, it is necessary to know the gross weight of the aircraft at the time that acceleration is being measured by a counting accelerometer. Therefore, there is a need for means other than a counting accelerometer for precisely measuring stress levels encountered by an aircraft.

SUMMARY OF THE INVENTION AND OBJECTS

The counting apparatus consists of means for measuring a parameter and producing an output signal which is substantially linearly proportional to the parameter measured. Filter means is provided for receiving the output signal and for filtering out spurious information contained in the output signal. A plurality of decision circuits have their inputs connected to the output of the filter means. A reference is provided for each of the decision circuits and is connected to the decision circuit. The references are of different values. The decision circuits are capable of determining when the output signal exceeds the reference connected to the decision circuit. Counting means is provided for registering each time the decision circuit makes the determination that the output exceeds the reference. Means is provided for retaining the information in the decision circuits until the output signal drops below a predetermined level.

In general, it is an object of the present invention to provide a counting apparatus which is substantially trouble free for long periods of time.

Another object of the invention is to provide a counting apparatus of the above character which is largely electronic in nature.

Another object of the invention is to provide a counting apparatus of the above character which can be utilized for measuring acceleration.

Another object of the invention is to provide a counting apparatus of the above character which can be utilized for measuring stress.

Another object of the invention is to provide a counting apparatus of the above character which can precisely measure stress levels encountered by aircraft regardless of the gross weight of the aircraft.

Another object of the invention is to provide a counting apparatus of the above character which can serve as form, fit and function replacements for mechanical type counting accelerometers.

Additional objects and features of the invention will appear from the following description in which the preferred embodiments are set forth in detail in conjunction with the accompanying drawings.

BRIEF DESCRIPTION OF THE DRAWING

The drawing shows a block diagram of a counting apparatus and in particular a counting accelerometer incorporating the present invention.

DESCRIPTION OF THE PREFERRED EMBODIMENTS

As shown in the drawing, the counting apparatus consists of a transducer for measuring a predetermined parameter such as an acceleration sensor 11 which is capable of measuring acceleration and producing an output signal which is linearly proportional to acceleration. The acceleration input to the acceleration sensor is indicated at $A_i$. Typically, the acceleration sensor 11 can be a servo accelerometer of the type described in U.S. Letters Pat. No. 3,074,279. As described in said patent, such an accelerometer consists of a restoring coil which is mounted in a magnetic field by the use of a pivot and jewel suspension system which provides a very low mechanical spring constraint and, therefore, very low spring drifts with temperature. A pick-off paddle is carried by the restoring coil and is acted upon by the acceleration forces. The position of the paddle is sensed by a pick-off coil which forms part of an oscillator. The output of the oscillator is detected and amplified and fed through a load resistor to the restoring coil to provide a servo feedback loop which is utilized for restoring the paddle to a null position. Such an accelerometer provides a high level d.c. output signal in the form of a voltage across the load resistor with high linearity. The choice of such an accelerometer is also desirable because it has long life under high vibration and has a low vibration offset.

An analog filter 12 is provided for receiving the output signal from the acceleration sensor 11 and filters out spurious unwanted a.c. information correctly sensed by the acceleration sensor 11. The acceleration sensor 11 can have a bandwidth which extends from zero to over 100 cycles per second and, therefore, a filter is necessary to eliminate unwanted high frequency signals which otherwise could prematurely actuate the subsequent parts of the counting accelerometer. If it is assumed that the analog filter has a response from zero to 3 cps (indicated as a 3 Hz corner in the block 12 of the drawing), the response above such a frequency should drop at a minimum predetermined rate as, for example, 12 db per octave. It is found that such a minimum drop rate requires that the filter can contain at least 2 poles, i.e., be at least a second order filter. In order to have sufficient flatness of response in the zero to 2.5 cps range, it is desirable that the filter 12 have at least 4 poles, i.e., be at least a fourth order filter. For example, a perfectly tuned Chebishev low pass filter with 4 poles can be adjusted to have an equal ripple response with peaks and valleys between zero and 2.5 cps of ±1.7% of value. The same filter would attenuate signals at 5 cps by a ratio of greater than 10:1. In order to achieve additional flatness, it may be desirable to utilize a 5 pole Chebishev filter which provides an additional safety factor to allow for initial alignment calibration and changes with temperature of the counting accelerometer. Such active filters are well known to those skilled in the art and are generally described in U.S. Pat. No. 3,122,714. Filters of this type are typically called active filters because they include active elements.

In a typical application, the counting accelerometer can be utilized for determining the stress life of aircraft. In such an application, the acceleration sensor 11 would typically be mounted at the center of gravity of the aircraft. This is desirable because when mounted in such a position, the acceleration sensor 11 senses the acceleration of the center of gravity of the aircraft and is not influenced by sudden angular motions of the aircraft. The acceleration sensor 11 is mounted in the aircraft so that its sensitive axis is disposed in a vertical direction when the aircraft is in a horizontal attitude. It, therefore, senses acceleration at right angles to both the pitch and roll axes of the aircraft. For this reason, the output of the acceleration sensor 11 normally includes an acceleration component of 1 G which is the normal force of gravity operating upon the aircraft when the aircraft is in a horizontal attitude during flight. The acceleration which it is desired to sense with the acceleration sensor 11 is, therefore, those accelerations which are normally above but sometimes below 1 G. In the particular embodiment of the counting accelerometer shown in the drawing, there is no attempt to record stresses which are below 1 G which would indicate acceleration towards the earth.

A plurality of level switching decision circuits 13 are provided, each of which has two inputs and an output. Switching devices which include comparable decision circuits are disclosed in U.S. Pat. No. 3,168,680. The level switching decision circuits 13 are also identified as LVC which indicates that they are latching voltage comparators. Latching voltage comparators are conventional and generally consist of an operational amplifier which is provided with a positive feedback loop so that when the output of the amplifier goes positive, it supplies its own input until a reset pulse is received. This means that once the latching voltage comparator has been operated, it will retain this information until it is reset. Each of the voltage comparators 13 is provided with two input terminals. One input terminal is connected to the output of the active filter 12, whereas the other terminal of the latching voltage comparator is connected to a reference voltage. When the counting accelerometer is utilized for determining load levels on aircraft, the voltage references correspond to the load levels which it is desired to measure. Normally, the voltage references from 1 through 4 represent progressively higher levels of acceleration as indicated by the progressive numbers 1, 2, 3 and 4.

The output signal from the filter 12 is also supplied to a reset voltage comparator 10 through one of its inputs. The other input is connected to a reference R which is of a predetermined value as, for example, a value representing an acceleration of 2 G. The output of the voltage comparator 16 is supplied to a one-shot multivibrator 17 which is in the set condition for a suitable predetermined period of time as, for example, 60 milliseconds. The output of the one-shot multivibrator 17 is supplied to an additional one-shot multivibrator 18 which has its output connected to the latching voltage comparators 13 to reset the same. The one-shot multivibrator 18 has a suitable set time as, for example, 1 millisecond.

The outputs of the latching voltage comparators 13 which serve as the decision circuits are connected to one of the two input terminals of AND gates 21. The other input terminals of the AND gates are connected to the output of an AND gate 22. The AND gate 22 is provided with two inputs, one of which is connected to the output of the multivibrator 17 and the other of which is connected to the output of a reset time interlock 23. The reset time interlock has its input connected to the output of the reset voltage comparator 16. The reset time interlock serves as a time selective digital filter which cuts out short term acceleration signals between the comparators 13 and the output of the AND gates 21. This digital filter does not provide amplitude attenuation but rather inhibits the production of a pulse in the output of the AND gates 21. The reset time interlock prevents pulses being supplied on the outputs of the AND gates 21 unless the acceleration signal supplied to the latching voltage comparators 13 has exceeded the reset comparator level for the comparator 16 for more than a predetermined period of time as, for example, 0.286 seconds.

The outputs of the AND gates 21 are supplied to power amplifiers 26 which have their outputs connected to count indicators 27 having a visible read-out. The count indicators can be any suitable electromechanical stepping type similar to those made by Veeder-Root, Durant, ITT, etc.

Operation and use of the counting apparatus may now be briefly described as follows. Let it be assumed that the counting accelerometer has been mounted on an aircraft in the manner hereinbefore described. Further, let it be assumed that it has been mounted on a transport aircraft in which the reset comparator 16 would be set at 1½ G, the first load level indicated by the voltage reference No. 1 at 2 G, the second voltage reference at 2½ G, the third voltage reference at 3 G, and the fourth voltage reference at 3½ G. These would be relatively mild accelerations for an airplane unless it is carrying a heavy load. For a fighter aircraft, the reset level might be set at 3½ G, the first load level at 6 G, the second at 7 G, the third at 8½ G, and the fourth at 10 G.

In operation, the acceleration sensor senses the acceleration and the spurious information is filtered out by the active filter 12. The output from the active filter is supplied to the latching voltage comparators 13 and to the reset comparator 16. The reset comparator registers a change in its output when the reset value of acceleration is reached. Nothing further, however, occurs at this time.

Now let it be assumed that the acceleration being experienced by the aircraft is substantially greater than 2 G. As the acceleration reaches higher levels, the latching voltage comparators 13 are latched and their output changes sign. As pointed out above, once this occurs, each voltage comparator 13 stays in this condition until it is reset. Next let it be assumed that the acceleration decreases to a point that it crosses the reset level represented by the reference R for the reset comparator 16. When this occurs, a pulse is produced by the comparator 16 which is supplied to the one-shot multivibrator 17. The output of the one-shot multivibrator 17 is supplied to the AND gate 22 and if the acceleration signal in excess of R supplied to the voltage comparators 13 has existed for greater than a predetermined period of time, an output will be supplied by the reset time interlock 23 to the AND gate 22 so that the AND gate 22 will supply a pulse to all four of the AND gates 21. The AND gates 21 produce an output pulse providing their respective comparator 13 is in the set condition. Thus, for all the set comparators, an output counter pulse 31 will be produced which will be amplified by the power amplifiers 26 and supplied to the associated counter 27, each of which will record a single count for each impulse received. This means that the counters 27 totalize the number of times they receive count pulses from the one-shot multivibrator 17. At the completion of the counter pulse 31 supplied from the one-shot multivibrator 17 and as shown in the drawing, a reset pulse 32 of very short time duration is supplied by the one-shot multivibrator 18 to all of the latching voltage comparators 13 to reset the same.

As soon as the reset pulse is received, the latching voltage comparators have all been reset and the counting accelerometer is ready for another excursion of acceleration above the reset level.

In the event the acceleration goes up and then comes back down but fails to come down far enough to actuate the reset comparator 16, then nothing further will occur unless an acceleration is encountered which is greater than that previously encountered. Then only those latching voltage comparators which previously have not been latched will be capable of being latched by the succeeding increasing acceleration. Thus, only when the acceleration returns to a reset value and actuates the one-shot multivibrator 17 will counts be registered in the counters 27.

If discrimination against acceleration pulses is not desired, the reset time interlock can be omitted as well as the gate 22 and the output of the multivibrator connected directly to the lower input of the gates 21.

Unless the gross weight of the aircraft is known, the precise stresses which are encountered by the aircraft cannot be measured merely by measuring acceleration. To make this possible, a stress measuring transducer should be substituted for the servo accelerometer 11. The stress measuring transducer can be of any suitable conventional type. The stress transducer or sensor provides a d.c. signal directly proportional to strain through use of an LVDT transducer reacting to linear displacement caused by stress over a suitable gauge length such as approximately two inches. Such a conventional stress sensor includes its own solid state oscillator to produce an a.c. drive for a differential transformer as well as a drive for the output demodulator which converts the a.c. output into a d.c. signal. The stress sensor senses stress in the critical area of the structure being monitored. When this is the case, for example, with an aircraft, the aircraft dynamic response remote from the area, assumptions of gross weight, altitude, etc., with the attendant inaccuracies are not required. By way of example, a stress sensor could be mounted in the wing root area of an aircraft.

The operation of the counting apparatus utilizing a stress gauge as the transducer is substantially identical to that hereinbefore described when a servo accelerometer was being utilized for the transducer. The output of the stress transducer is processed through the active filter 12 which, as hereinbefore explained, can be a special low pass filter in order to accept and record only the meaningful low frequency stress measurements. By way of example, a fifth order Chesbyschev rotor with a 2.7 Hz corner was designed in order to completely reject all data above the 0–3 Hz frequency band. Such a filter was found to exhibit a response flatness of better than ±0.05 db from 0 Hz to the corner frequency. Thus, the residual signal from the filter is essentially a low frequency pulse, since inputs of less than a half sine period of approximately 0.150 seconds are rejected by the filter. The filter 12 thus assures that only sustained loads of significant time duration will be recorded.

The filtered analog signal is then fed to the comparator means which determines which of the four individual stress levels have been exceeded. The operation of the remainder of the circuitry is substantially identical to that hereinbefore described.

From the foregoing, it can be seen that the counter for the first load level will always have recorded in it the largest number of counts since it would always record even though the output went to a higher level. The number of counts in each of the other counters would be progressively fewer because the output level is increased.

From the foregoing, it also can be seen that there has been disclosed a counting apparatus which has many advantageous features. Except for the transducer 11 and for the electromechanical counters, the counting apparatus is substantially all electronic. It has unique filtering capabilities.

I claim:
1. In a counting accelerometer, a single means for sensing acceleration for producing an output signal substantially linearly proportional to acceleration, filter means for receiving the output signal and for filtering out spurious information contained in the output signal, a plurality of electronic decision circuits, each of said decision circuits having a pair of inputs and an output, one of the inputs in each of the decision circuits being coupled to the output of the filtering means, a reference for each of said decision circuits connected to the other input of the respective decision circuit, said references having different values, counting means for registering each time each decision circuit makes a determination that the output signal from the single means for sensing acceleration exceeds each reference, and means for causing delayed resetting of each of the decision circuits after the information carried by the decision circuits has been registered in the counting means, said means for causing delayed resetting for each of the decision circuits including means for preventing the resetting of the decision circuit after the output signal of the means for sensing acceleration has reached a value greater than a predetermined reference value until the output signal of the means for sensing acceleration returns to a value less than the predetermined reference value.

2. A counting accelerometer as in claim 1 wherein said means for causing delayed resetting includes means for preventing a count from being registered in the counting means unless said output signal exceeds said predetermined value for a predetermined interval of time.

3. A counting accelerometer as in claim 1 wherein said means for causing delayed resetting of each of the decision circuits includes a reset comparator, and a reference for the reset comparator representing the predetermined reference value of acceleration.

4. A counting accelerometer as in claim 1 wherein each of said decision circuits is capable of supplying an output continuously after it makes a determination that the output signal from the single means for sensing acceleration exceeds the respective reference.

5. A counting accelerometer as in claim 1 wherein said filtering means consists of an active filter having at least two poles.

6. In a counting accelerometer, means for sensing acceleration for producing an output signal substantially linearly proportional to acceleration, an active filter for receiving the output signal and for filtering out spurious information contained in the output signal, a plurality of latching voltage comparators, each of said comparators having two inputs and an output, means connecting one of the inputs of each of the latching voltage comparators to the active filter, a plurality of references representing different values of acceleration, means connecting the references to the latching voltage comparator so that each latching voltage comparator represents a different predetermined acceleration value, a plurality of counters, and means coupling the outputs of the latching voltage comparators to the counters, said last named means including delay means for preventing the outputs from the latching voltage comparators from actuating each of the counters, said delay means including means for preventing actuation of a counter after the predetermined acceleration value has been recorded by the latching voltage comparator coupled to the counter but not before the acceleration being measured by the means for sensing acceleration drops to a value below the predetermined acceleration value.

7. A counting accelerometer as in claim 6 wherein said means for preventing the outputs from the latching voltage comparators from actuating the counters includes a plurality of gates connected between the outputs of the latching voltage comparators and the inputs to the counters, and means for inhibiting the gates.

8. A counting accelerometer as in claim 7 wherein said means for inhibiting the gates includes a reference and a reset comparator having two inputs and an output, one of the inputs being connected to the output of the active filter and the other of the inputs being connected to said reference for the reset comparator, and means connected to the output of the reset comparator to permit the signals from the latching voltage comparators to be supplied to the counters.

9. A counting accelerometer as in claim 8 wherein said means connected to the output of the reset comparator includes a reset time interlock.

10. A counting accelerometer as in claim 8 together with means actuated by the reset comparator for resetting the latching voltage comparators.

11. In a counting apparatus, a single transducer for measuring a predetermined parameter and for producing an output signal substantially linearly proportional to the parameter, filter means for receiving the output signal and for filtering out spurious information contained in the output signal, a plurality of electronic decision circuits, each of said decision circuits having a pair of inputs and an output, one of the inputs of each decision circuit being connected to the output of the filter means, a reference for each of said decision circuits connected to the other input of the respective decision circuit, said references having different values selected between a highest and a lowest value, counting means, electronic gate means for coupling the outputs of said decision circuits to said counting means, electronic means for enabling said gate means at a time after an output is present on at least one of the outputs of one of the decision circuits whereby said counting means registers when the decision circuits make determinations that the output signal from the transducer reaches the respective reference values, and electronic means for resetting the decision circuits after the information provided by the outputs of the decision circuits has been registered in the counting means.

12. A counting apparatus as in claim 11 wherein said transducer is a servo accelerometer.

13. A counting apparatus as in claim 11 wherein said transducer is a stress transducer.

14. A counting apparatus a single transducer for measuring a predetermined parameter and for producing an output signal substantially linearly proportional to the parameter, filter means for receiving the output signal and for filtering out spurious information contained in the output signal, a plurality of electronic decision circuits, each of said decision circuits having a pair of inputs and an output, one of the inputs of each decision circuit being connected to the output of the filter means, a reference for each of said decision circuits connected to the other input of the respective decision circuit, said references having different values selected between a highest and a lowest value, counting means responsive to the outputs of said decision circuits for registering each time each decision circuit makes a determination that the output signal from the transducer reaches the respective reference value, means for resetting the decision circuits after the output information provided by the decision circuits has been registered in the counting means and means for preventing a count from being registered in the counting means unless the output of said single transducer has at least maintained said lowest reference value for a predetermined interval of time.

15. An accelerometer for counting the number of times each of a plurality of acceleration loadings of predetermined magnitude of an aircraft occur, comprising means adapted to be mounted on an aircraft for sensing acceleration loadings on said aircraft and providing acceleration signals proportional to said acceleration loadings, a plurality of sensing and storing means, each responsive to an acceleration signal reaching a different predetermined value for sensing such signal and storing an indication thereof, a plurality of acceleration level recording means, means responsive to an acceleration signal reaching a reference level and providing a reference output, and means responsive to said reference output for passing a count signal from each of said sensing and storing means in which an indication is stored to the associated acceleration level recording means at a time after said reference output is provided, said means for passing a count signal including electronic gate means and means for enabling said electronic gate means.

16. An accelerometer for counting the number of times each of a plurality of acceleration maneuvering loadings of predetermined magnitude of an aircraft occur, comprising means adapted to be mounted to an aircraft for sensing acceleration loading thereof and providing a signal proportional to said accelerations, a plurality of sensing and storing means each responsive to said acceleration proportional signal reaching a different predetermined value for sensing such signal and storing an indication of the value reached, a plurality of acceleration level recording means, timing means for furnishing a signal having a predetermined time duration period, means responsive to said acceleration proportional signal decreasing below a predetermined level for actuating said timing means, means responsive to said signal from said timing means for passing a signal from each of said sensing and storing means to an associated one of said recording means.

17. An accelerometer as in claim 16 together with means responsive to the end of said signal from said timing means for resetting said pluralty of sensing and storage means.

18. A counting accelerometer comprising a single transducer for sensing a range of acceleration and for providing an output indicative of acceleration level, a plurality of electronic decision circuits, means for providing a plurality of reference acceleration level signals, means coupling said output indicative of acceleration level and one of said plurality of reference acceleration level signals to each of said decision circuits, said decision circuits operating to provide an output when said output indicative of acceleration level reaches said respective reference acceleration level, and means for providing a record of the number of times said output indicative of acceleration level output reaches each of said reference acceleration signal levels, said last named means including a plurality of counting means, electronic gate means for coupling the outputs of the decision circuits to the plurality of counting means and electronic means for enabling said electronic gate means at a time after an output is present on at least one of the outputs of one of the decision circuits.

19. A counting accelerometer as in claim 18 together with electronic means for resetting the decision circuits after the information provided by the outputs of the decision circuits has been registered in the counting means.

20. A counting accelerometer comprising a single transducer for sensing a range of acceleration and for providing an output indicative of acceleration level, a plurality of electronic decision circuits, means for providing a plurality of reference acceleration level signals, means coupling said output indicative of acceleration level and one of said plurality of reference acceleration level signals to each of said decision circuits, said decision circuits operating to provide an output when said output indicative of acceleration level reaches said respective reference acceleration level, a plurality of counting means for providing a record of the number of times said output indicative of acceleration level output reaches each of said reference acceleration signal levels, a reset decision circuit for providing a reference output when said output indicative of acceleration level reaches a predetermined lower reference level and thereafter falls below said lower reference level, timing means actuated by said reference output and providing a count output at the end of a predetermined period of time after actuation, a plurality of gates for receiving said decision circuit outputs and said count output and providing gate outputs responsive thereto and means coupling said gate outputs to said counting means 21. A counting accelerometer as in claim 20 wherein said count output has a predetermined dwell time together with means actuated by the end of said count output for resetting said decision circuits.

22. A counting accelerometer comprising a single transducer for sensing a range of acceleration and for providing an output indicative of acceleration level, a plurality of electronic decision circuits, means for providing a plurality of reference acceleration level signals, means coupling said output indicative of acceleration level and one of said plurality of reference acceleration level signals to each of said decision circuits, said decision circuits operating to provide an output when said output indicative of acceleration level reaches said respective reference acceleration level, a plurality of counting means for providing a record of the number of times said output indicative of acceleration level output reaches each of said reference acceleration signal levels, a reset decision circuit for providing a reference output when said output indicative of acceleration level reaches a lower reference level, timing means actuated by said reference output for timing a predetermined period and for providing a terminating output indicative of the end of said period, a first gate for receiving said terminating output and for passing a count signal after said reference output has existed for as least as long as said predetermined period, and a plurality of second gates for coupling the outputs of the decision circuits to the counting means for providing gate outputs to said counting means when said count signal and said decision circuit outputs are present at the second gate.

23. A counting accelerometer as in claim 22 wherein said reset decision circuit provides an additional reference output when said reference output terminates, together with additional timing means actuated by said reference output termination for providing said count signal.

24. In a counting accelerometer, a single means for sensing acceleration and for producing an output signal substantially linearly proportional to acceleration, a plurality of electronic decision circuits, each of said decision circuits having a pair of inputs and an output, one of the inputs being coupled to receive the output signal proportional to acceleration, a reference for each of said decision circuits connected to the other input of the respective decision circuit, said references having different values, said decision circuits providing a determination when the output signal is equal to said reference, counting means for registering and accumulating each time each decision circuit makes a determination that the output signal from the single means for sensing acceleration exceeds each reference, electronic gate means for coupling the determinations of the decision circuits to the counting means, electronic means or enabling said electronic gate means at a time after a determination is made by at least one of said decision circuits, and means for causing resetting of each of the decision circuits after the information carried by the decision circuits has been registered in the counting means.

25. A counting accelerometer as in claim 24 wherein each of said decision circuits is capable of supplying an output continuously after it makes a determination that the output signal from the single means for sensing acceleration exceeds the respective reference.

26. A counting accelerometer a single means for sensing acceleration and for producing an output signal substantially linearly proportional to acceleration, a plurality of electronic decision circuits, each of said decision circuits having a pair of inputs and an output, one of the inputs being coupled to receive the output signal proportional to acceleration, a reference for each of said decision circuits, connected to the other input of the respective decision circuit, said references having different values, said decision circuits providing a determination of when the output signal is equal to said reference, counting means for registering and accumulating each time each decision circuit makes a determination that the output signal from the single means for sensing acceleration exceeds each reference, and means for causing resetting of each of the decision circuits after the information carried by the decision circuits has been registered in the counting means, said means for causing resetting including means for preventing a count from being registered in the counting means unless said output signal exceeds said predetermined value for a predetermined interval of time.

27. A counting accelerometer a single means for sensing acceleration and for producing an output signal substantially linearly proportional to acceleration, a plurality of electronic decision circuits, each of said decision circuits having a pair of inputs and an output, one of the inputs being coupled to receive the output signal proportional to acceleration, a reference for each of said decision circuits connected to the other input of the respective decision circuit, said references having different values, said decision circuits providing a determination when the output signal is equal to said reference, counting means for registering and accumulating each time each decision circuit makes a determination that the output signal from the single means for sensing acceleration exceeds each reference, and means for causing resetting of each of the decision circuits after the information carried by the decision circuits has been registered in the counting means, said means for causing resetting of each of the decision circuits including a reset comparator, a reference for the reset comparator representing a predetermined reference value of acceleration, said reference comparator providing an output signal when acceleration first exceeds and then decreases through said predetermined reference value, and means coupled to the output of said reset comparator for providing a reset signal connected to said decision circuits.

* * * * *